(12) United States Patent
Peterson et al.

(10) Patent No.: US 10,439,933 B2
(45) Date of Patent: Oct. 8, 2019

(54) ISOLATING SERVICES ACROSS A SINGLE PHYSICAL NETWORK INTERFACE

(71) Applicant: Entry Point, LLC, Salt Lake City, UT (US)

(72) Inventors: Jeffrey Peterson, Idaho Falls, ID (US); Eric Turner, Idaho Falls, ID (US); Robert Peterson, Idaho Falls, ID (US)

(73) Assignee: Entry Point, LLC, Salt Lake City, UT (US)

( * ) Notice: Subject to any disclaimer, the term of this patent is extended or adjusted under 35 U.S.C. 154(b) by 27 days.

(21) Appl. No.: 15/866,336

(22) Filed: Jan. 9, 2018

(65) Prior Publication Data
US 2019/0215265 A1 Jul. 11, 2019

(51) Int. Cl.
*H04L 12/28* (2006.01)
*H04L 12/723* (2013.01)
*H04L 29/08* (2006.01)
*H04L 29/06* (2006.01)
*H04L 12/24* (2006.01)
*H04L 29/12* (2006.01)

(52) U.S. Cl.
CPC ...... *H04L 45/502* (2013.01); *H04L 29/06238* (2013.01); *H04L 29/06965* (2013.01); *H04L 29/08621* (2013.01); *H04L 41/00* (2013.01); *H04L 61/00* (2013.01); *H04L 65/4084* (2013.01); *H04L 65/605* (2013.01); *H04L 65/607* (2013.01); *H04L 65/608* (2013.01); *H04L 29/08018* (2013.01); *H04L 63/20* (2013.01)

(58) Field of Classification Search
CPC ....................................................... H04L 45/502
See application file for complete search history.

(56) References Cited

U.S. PATENT DOCUMENTS

| | | | |
|---|---|---|---|
| 9,363,180 B2 * | 6/2016 | Beliveau | H04L 45/38 |
| 9,590,907 B2 * | 3/2017 | Beliveau | H04L 45/38 |
| 9,654,395 B2 * | 5/2017 | Park | H04L 45/745 |
| 10,038,622 B2 * | 7/2018 | Chanda | H04L 45/38 |
| 10,230,632 B2 * | 3/2019 | Cui | H04L 67/16 |
| 2013/0272305 A1 * | 10/2013 | Lefebvre | H04L 47/24 370/392 |
| 2016/0248673 A1 * | 8/2016 | Beliveau | H04L 45/38 |
| 2016/0352632 A1 * | 12/2016 | Nedeltchev | H04L 45/502 |

* cited by examiner

*Primary Examiner* — Guang W Li
(74) *Attorney, Agent, or Firm* — Kirton McConkie; Brian Tucker (57) ABSTRACT

Services can be isolated across a single physical network interface. A gateway that is installed at the user's premises can include a single inbound port over which multiple services can be provided to the premises. The gateway can evaluate all outbound frames that are received at the port to identify to which service they pertain and then tag the frames with an identifier assigned to the service. This tagging will enable the frames to be delivered to the intended service provider. When the gateway receives an inbound frame, it can strip the identifier from the frame and forward it over the single inbound port regardless of the service to which it pertains. In this way, multiple services that are provided to the user's premises can remain isolated on the wide area network even though they are provided over the same physical medium on the user's local area network.

20 Claims, 8 Drawing Sheets

501 Maintain, At The Networking Device, An ID Table That Includes Entries That Associate IDs With Matching Criteria, The ID Table Including A First Entry That Associates A First ID With A First Set Of Criteria And A Second Entry That Associates A Second ID With A Second Set Of Criteria

502 Receive, Via A Port Of The Networking Device, A First Frame

503 Evaluate Contents Of The First Frame

504 Compare The Contents Of The First Frame Against The Entries Of The ID Table

505 Upon Determining That The Contents Of The First Frame Match The First Set Of Criteria, Modify The First Frame To Include The First ID

506 Forward The Modified First Frame To The Switches Of The Network

507 Receive, Via The Port, A Second Frame

508 Evaluate Contents Of The Second Frame

509 Compare The Contents Of The Second Frame Against The Entries Of The ID Table

510 Upon Determining That The Contents Of The Second Frame Match The Second Set Of Criteria, Modify The Second Frame To Include The Second ID

511 Forward The Modified Second Frame To The Switches Of The Network

*FIG. 5*

ISOLATING SERVICES ACROSS A SINGLE PHYSICAL NETWORK INTERFACE

CROSS-REFERENCE TO RELATED APPLICATIONS

N/A

BACKGROUND

Software-defined networking (SDN) is a general term which includes a number of networking technologies. SDN aims to separate the control plane of the network from the data plane of the network to create an agile and flexible network. In a software-defined network, the switch(es) or other components that form the physical topology of the network can communicate with the controller to determine how frames should be directed within the network. In this way, the controller can create, modify, or remove connections between two endpoints to dynamically provision services between the endpoints.

During this provisioning of services, it is important to note that the physical topology of the network remains unchanged. Instead, to provision a service between two endpoints (e.g., between a user's home and an edge switch of a provider), the controller will typically employ knowledge of the network topology including how the endpoints are physically interconnected, current traffic on the network, and any quality of service requirements (among possible other factors) to select and create a virtual network between the endpoints. This is accomplished by programming the appropriate switches or other components to forward frames pertaining to the service so that they traverse a selected path to reach their endpoint. In some implementations, only components located at the edge of the network topology may implement this software-defined networking technique.

Various protocols and techniques exist for provisioning services in this manner. For example, a software-defined network may be configured to employ VLAN tags (or other identifiers) within the frames to define to which service the frames pertain. By accessing the VLAN tag in a frame it receives, a switch can determine, based on its programmed rules, how to forward the frame so that the frame traverses the path that was defined for that service. In this type of environment, frames pertaining to multiple services can be transferred over the same physical wire but remain isolated due to the VLAN tags they include.

Figure 1:
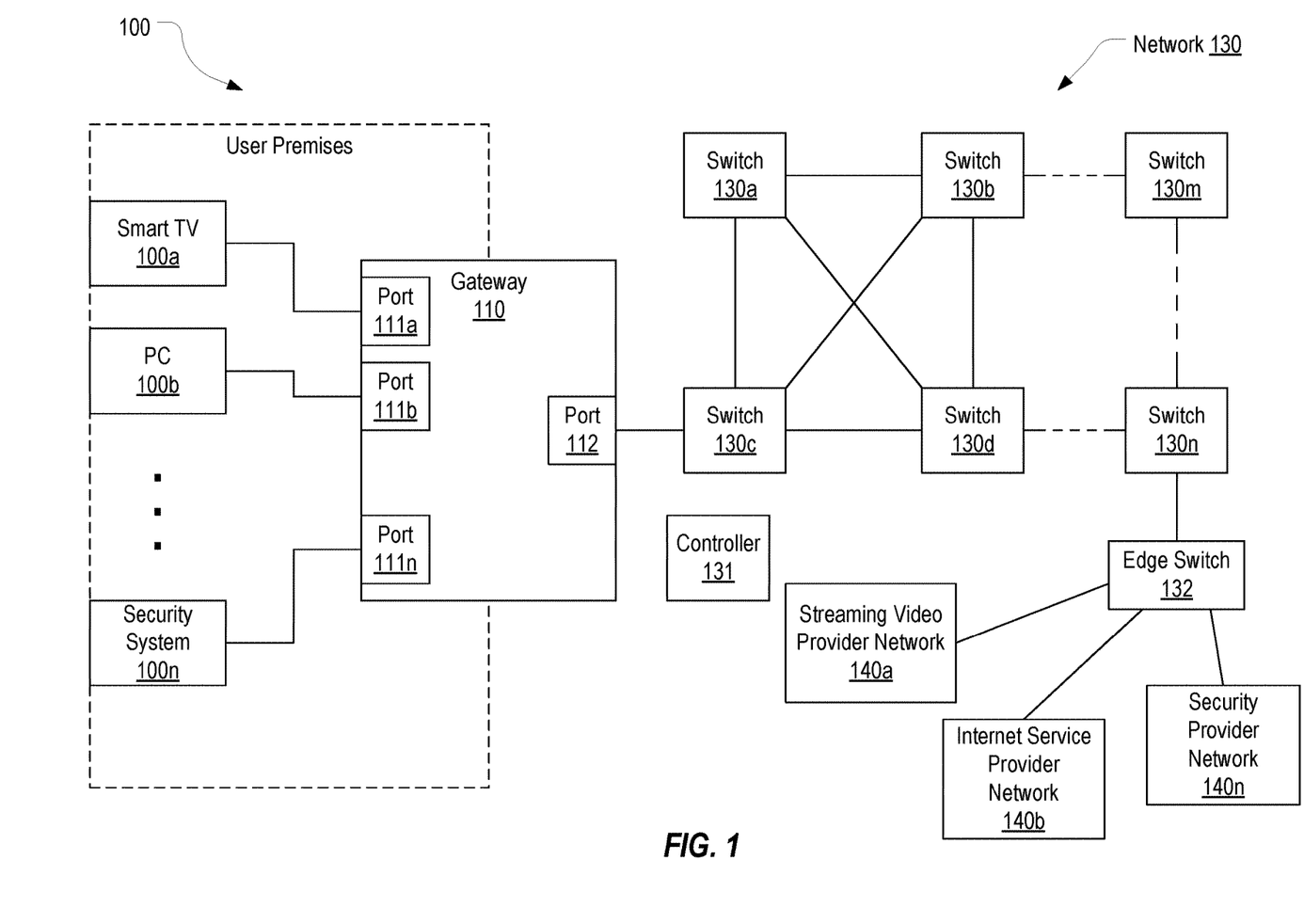
FIG. 1 illustrates an example of a prior art software-defined networking architecture.

FIG. 1 provides a simplified example of a prior art software-defined network architecture 100. Architecture 100 includes a network 130 that consists of a number of interconnected switches 130a-130n that form a switching fabric (where n represents any integer greater than one). A number of entities can connect to network 130 including service providers and end users. Service providers may typically include a network that connects to network 130 via an edge switch. In contrast, an end user may typically employ a gateway to connect to network 130. A controller 131 can control components within architecture 100. In some embodiments, controller 131 may configure gateway 110 for the purpose of provisioning services between the end user and a service provider. In some embodiments, controller 131 may also configure edge switch 132 or some or all of switches 130a-130n to provision such services.

In one example, a streaming video provider network 140a (e.g., Netflix, Hulu, Sling, etc.), an internet service provider network 140b, and a security provider network 140n can each be connected to a particular port of edge switch 132. Additionally, a user's premises (e.g., a home or business location) includes a smart TV 100a, a PC 100b, and a security system 100n.

The user may desire to employ smart TV 100a, PC 100b, and security system 100n to receive services over network 130. To connect smart TV 100a, PC 100b and security system 100n (or any other network connectable device) to network 130, the user can employ gateway 110. Gateway 110 includes an outbound (or wide area network (WAN)) port 112 by which it connects to a switch (e.g., switch 131c) of network 130. Gateway 110 also includes a number of inbound (or local area network (LAN)) ports 111a-111n by which the end user may connect the various devices to gateway 110.

An important distinction between a software-defined network and a typical internet connection is that a software-defined network allows a user to access a service independent of the internet. For example, in an internet-based scenario, if the user desires to subscribe to Netflix, the user must first subscribe to an internet service provider (e.g., Comcast, Verizon, Time Warner, AT&T, etc.) to access Netflix. In this scenario, the user accesses Netflix over the internet. In contrast, with a software-defined network and assuming streaming video provider network 140a is Netflix, controller 131 can provision the delivery of Netflix to the user's premises independent of any internet access.

As mentioned above, architecture 100 may use layer two identifiers (hereinafter generally "IDs") to distinguish between different services that have been provisioned over network 130. For example, a streaming video service that has been provisioned for the end user could be assigned an ID of 1234. In such a case, any frame that the streaming video provider sends to the end user will be labeled with 1234. On the service side, this labeling of frames is performed at the edge switch by which the provider's network is connected to network 130. Therefore, edge switch 132 would label a frame that is intended for the end user with 1234 if that frame is received over the port associated with streaming video provider network 140a.

As mentioned above, gateway 110 includes multiple inbound ports 111a-111n. This is necessary to enable multiple services to be delivered to the user's premises via gateway 110. In particular, as part of provisioning a service to the user's premises, controller 131 can instruct gateway 110 to deliver incoming frames that have a particular ID to one of ports 111a-111n. Similarly, controller 131 can instruct gateway 110 to assign the particular ID to any outgoing frame that is received at the same port. In other words, each service delivered to the user's premise requires its own inbound port on gateway 110.

Accordingly, in FIG. 1, it is assumed that the streaming video service is provided to the user's premises via port 111a, the internet service is provided via port 111b, and the security system service is provided via port 111n. In this scenario, gateway 110 creates the appearance that there are multiple separate networks available at the user's premises (i.e., gateway 110 provides multiple virtual networks).

Although this one-to-one relationship between services and ports provides service isolation, it also creates various practical difficulties. For example, to use a service on a device, the device will have to be connected to the appropriate port. In FIG. 1, smart TV 100a will have to be connected (whether via an Ethernet cable, Wi-Fi, or another interface) to port 111a in order to use the streaming video service. On the other hand, PC 100b will have to be connected to port 111b to use the internet. In this scenario, the internet will not be available on smart TV 100a and the streaming video service will not be available on PC 100*b*. It can also be difficult to physically connect each device to the proper port. For example, many homes and businesses are wired for a single network that is shared by all devices. In such cases, it would be necessary to either purchase multiple routers to employ separate Wi-Fi networks for each service and/or add additional wiring to connect the devices to the appropriate port of gateway 110. Also, in many cases, gateway 110 may not be located inside the building or in an easily accessible area.

BRIEF SUMMARY

The present invention extends to methods, systems and computer program products for isolating services across a single physical network interface. A gateway that is installed at the user's premises can include a single inbound port over which multiple services can be provided to the premises. The gateway can evaluate all outbound frames that are received at the port to identify to which service they pertain and then label the frames with an identifier assigned to the service. This labeling will enable the frames to be delivered to the intended service provider. When the gateway receives an inbound frame, it can strip the identifier from the frame and forward it over the single inbound port regardless of the service to which it pertains. In this way, multiple services that are provided to the user's premises can remain isolated on the wide area network even though they are provided over the same physical medium on the user's local area network.

In one embodiment, the present invention is implemented by a networking device that is connected to switches of a network as a method for modifying frames to include a service-specific identifier. The networking device maintains an ID table that includes entries that associate IDs with matching criteria. The ID table includes a first entry that associates a first ID with a first set of criteria and a second entry that associates a second ID with a second set of criteria. A first frame is received via a port of the networking device. The networking device evaluates contents of the first frame and compares the contents of the first frame against the entries of the ID table. Upon determining that the contents of the first frame match the first set of criteria, the networking device modifies the first frame to include the first ID and forwards the modified first frame to the one or more switches of the network. A second frame is received via the port. The networking device evaluates contents of the second frame and compares the contents of the second frame against the entries of the ID table. Upon determining that the contents of the second frame match the second set of criteria, the networking device modifies the second frame to include the second ID and forwards the modified second frame to the one or more switches of the network.

In another embodiment, the present invention is implemented as computer storage media storing computer executable instructions which, when executed by a gateway that connects one or more user devices to a network, implement a method for modifying frames to include a service-specific identifier. The method includes: receiving, via a port of the gateway, a first frame; evaluating contents of the first frame; comparing the contents of the first frame against entries of an ID table; determining that the contents of the first frame match a first set of criteria defined in a first entry of the ID table; modifying the first frame to include a first ID defined in the first entry; and forwarding the modified first frame over the network.

In another embodiment, the present invention is implemented as a software-defined network architecture that includes: a gateway with an inbound port to which one or more user devices are connected and an outbound port by which the gateway connects to one or more switches of a network; and an edge switch that connects multiple service provider networks to the one or more switches of the network. The gateway includes an ID table that defines entries each of which associates a unique ID with matching criteria. The gateway is also configured to evaluate frames that are received from the user devices via the inbound port against the entries in the ID table such that, when contents of a particular frame matches the matching criteria of a particular entry, the gateway modifies the particular frame to include the associated unique ID before forwarding the frame over the outbound port.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, a gateway should be construed as an electronic device that includes at least one outbound port for coupling to a WAN and at least one inbound port for coupling to a LAN. The term "layer two" should be construed as the data link layer of the OSI model, while the term "layer three" should be construed as the network layer of the OSI model. A layer two identifier (or ID) should encompass any of the various types of identifiers that can be added to a frame including, for example, a VLAN tag, an MPLS label, or a Segment Routing segment label. The present invention should not be limited to any particular layer two protocol. For illustrative purposes only, the 802.1Q or 802.1ad protocol could be used in embodiments of the present invention. The term "port" should be construed as a physical layer two interface and should not be confused with logical ports at the transport layer.

Figure 2:
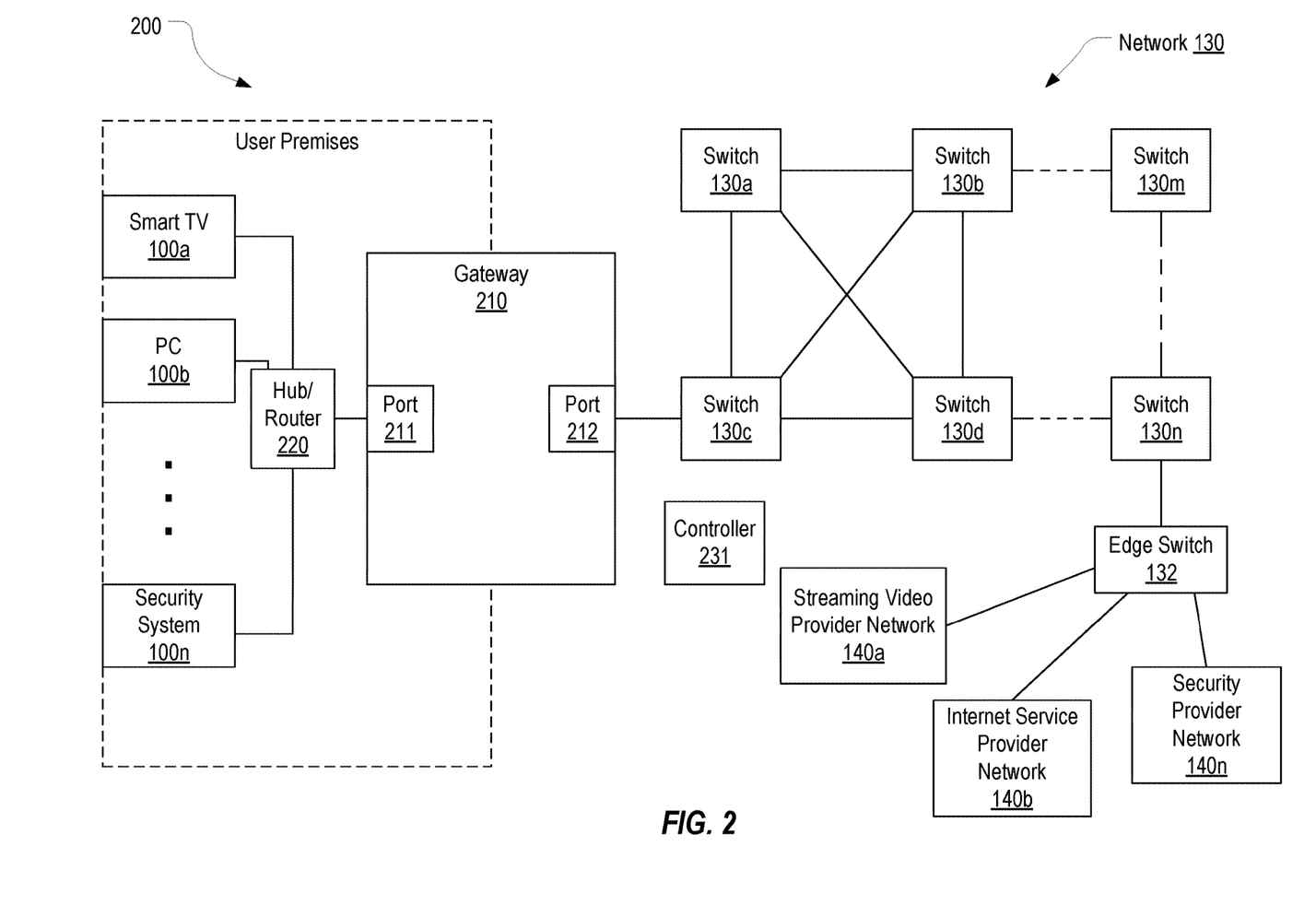
FIG. 2 illustrates a software-defined networking architecture in accordance with embodiments of the present invention.

FIG. 2 illustrates an example software-defined networking architecture 200 that is configured in accordance with embodiments of the present invention. To simplify the description, architecture 200 includes the same configuration of network 130 and provider networks 140a-140n as depicted in FIG. 1. This is also intended to represent that the present invention can be implemented in existing networks.

In contrast to FIG. 1, architecture 200 includes a gateway 210 that has an outbound port 212 and a single inbound port 211. It is noted that gateway 210 could have multiple inbound ports, but the techniques of the present invention pertain to management of frames over a single inbound port. Therefore, the techniques of the present invention could be implemented independently over each inbound port of a gateway. Also in contrast to FIG. 1, smart TV 100a, PC 100b, and security system 100n are all connected to inbound port 211 of gateway 210 (e.g., via a hub or router 220). Accordingly, in the present invention, there is a one-to-many relationship between a port and services provided to the user's premises.

Figure 3A:
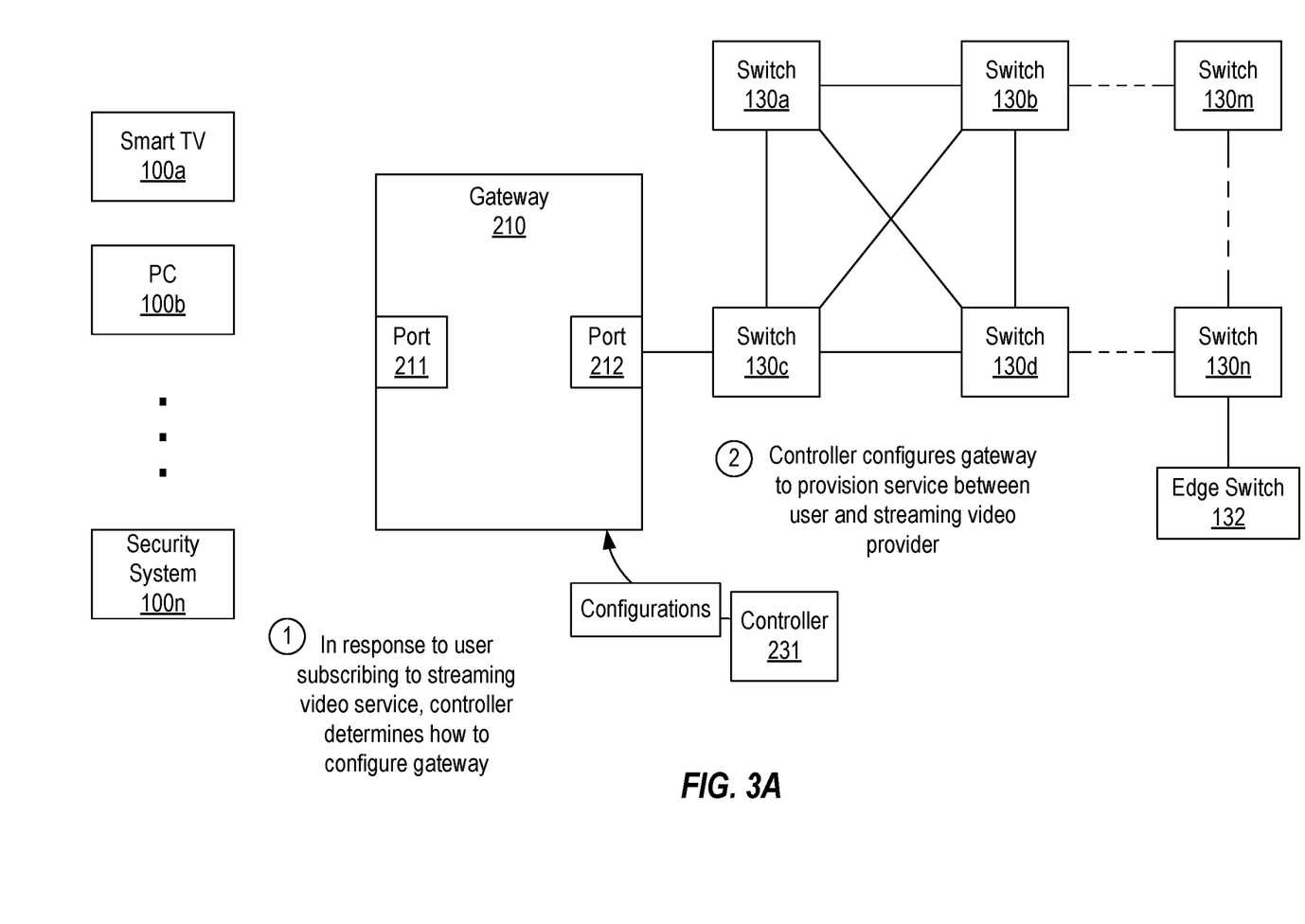
FIGS. 3A-3D illustrate a process by which frames received via a common port can be modified to include a service-specific identifier.

FIGS. 3A-3D illustrate how this one-to-many relationship can be implemented within example architecture 200. In FIG. 3A, it is assumed that the user has subscribed to streaming video services available via streaming video provider network 140a. The manner in which the user subscribes is not essential to the invention. Of importance is the fact that controller 231 will receive and/or access information about gateway 210 by which the user accesses network 130 and information about edge switch 132 by which the streaming video provider connects to network 130. With this information, and in step 1, controller 231 can determine how to configure gateway 210 to provision a virtual network between the user and the streaming video provider. This can include selecting an ID to be added to frames sent between the user and the steaming video provider and defining matching criteria to be used by gateway 210 to identify which frames should be modified to include the selected ID. Based on these determinations, in step 2, controller 231 can send configurations to gateway 210 to cause it to appropriately modify outbound frames. In this example, it will be assumed that the MAC address of smart TV 100a is MAC1 and the IP address where the streaming video services are made available is IP1.

Figure 3B:
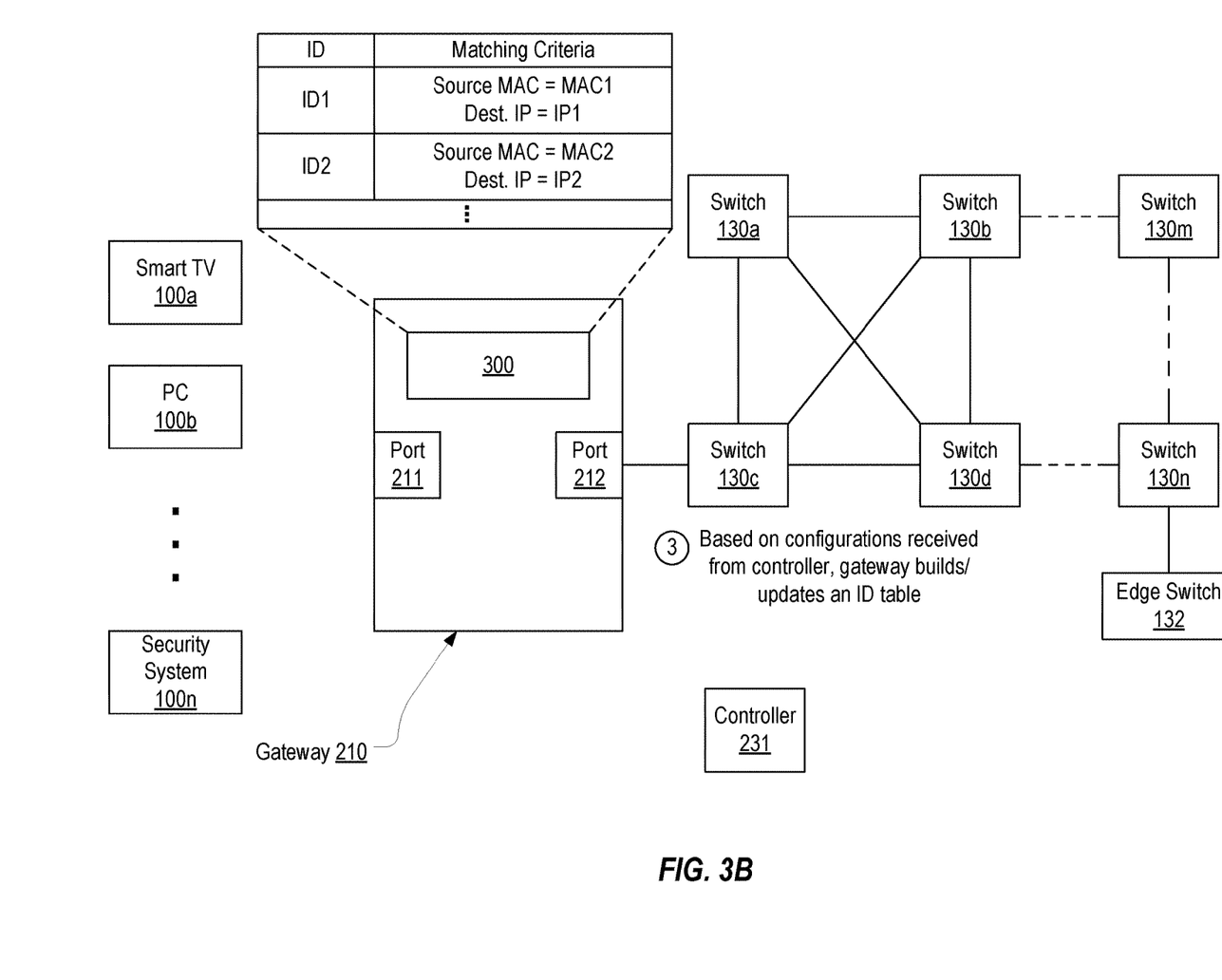

Turning now to FIG. 3B, it will be assumed that the configurations sent to gateway 210 included an ID of ID1 and corresponding matching criteria that identifies a source MAC address of MAC1 and a destination IP address of IP1. Therefore, step 3 represents that gateway 210 has built or updated an ID table 300 that includes a first entry pertaining to the streaming video service which associates ID1 with MAC1 and IP1. For illustrative purposes, it will also be assumed that ID table 300 already included an entry that associates ID2 with MAC2 and IP2 and that this second entry pertains to security services. The role of ID table 300 is to define which ID gateway 210 should add to outbound frames it receives at port 211. Accordingly, after step 3, a virtual network between gateway 210 and edge switch 132 will have been defined to allow frames to flow between the user's device (which is assumed to be smart TV 100a) and streaming video provider network 140a.

With the virtual network implemented, the user can commence receiving streaming video services at smart TV 100a (or another device connected to gateway 210 assuming corresponding entries have been created in ID table 300). For example, in FIG. 3C, it is assumed that the user employs smart TV 100a to access the streaming video service. As an example only, the user may launch the Netflix application on smart TV 100a. However, the same process may result if the user employed PC 100b to access Netflix (again assuming corresponding entries have been created in ID table 300). In accordance with standard protocols, in step 4, smart TV 100a can generate a frame that includes the IP address of the streaming video service (IP1) as the destination address in the IP packet and its own MAC address (MAC1) as the source address in the frame. Of course, the frame would also include a source IP address (which will likely be a private IP address assigned to smart TV 100a) and a destination MAC address (which will likely be the MAC address of gateway 210) among other things, but these fields will be ignored in the current example.

Figure 3C:
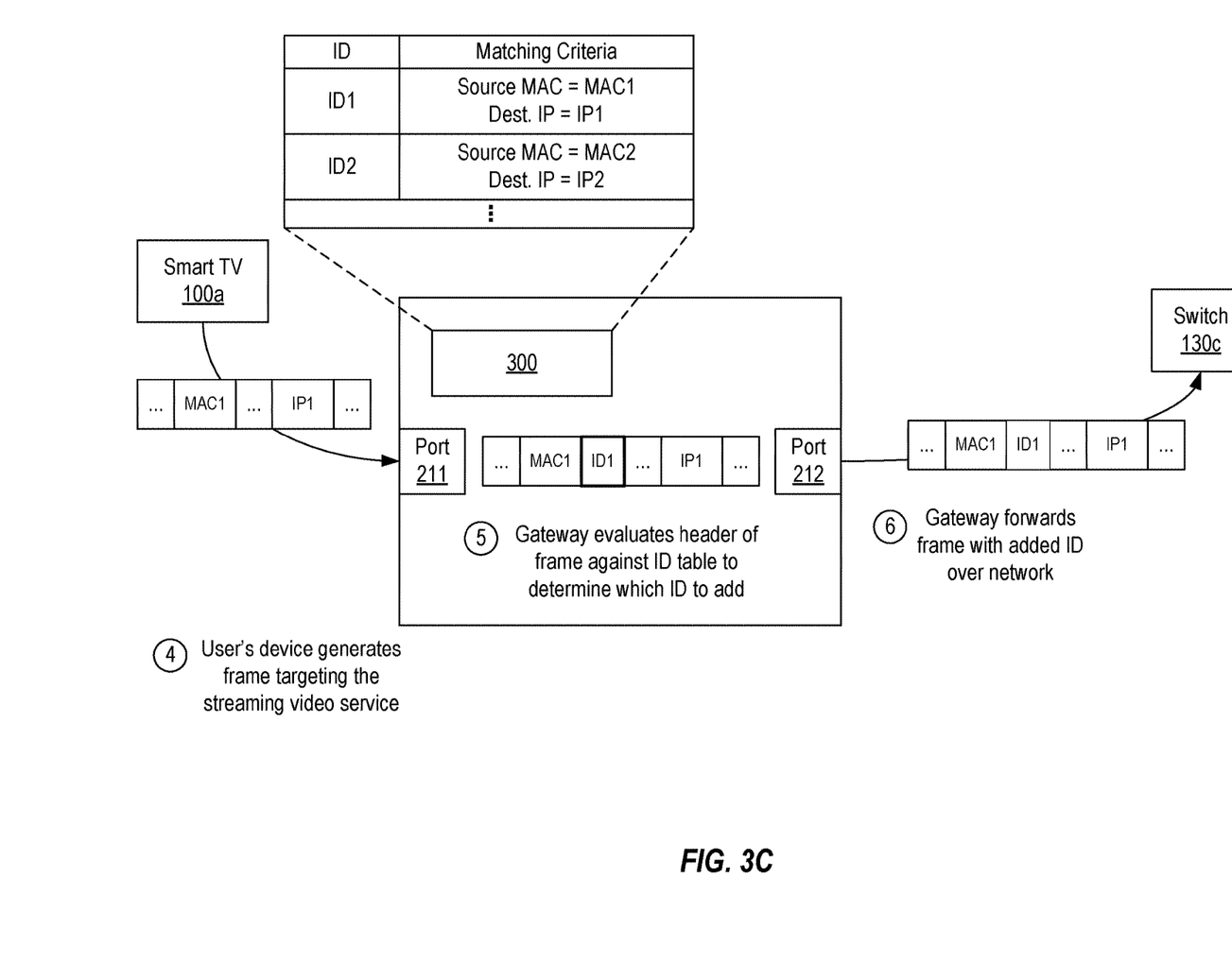

Importantly, gateway 210 will receive this frame via port 211—the same port by which gateway 210 would receive frames pertaining to other services to which the user has subscribed (e.g., internet communications, security communications, etc.). To direct frames to the intended provider network, gateway 210 can modify outbound frames it receives to include the proper ID. This is accomplished using ID table 300. For example, in step 5 and in response to receiving the frame from smart TV 100a in step 4, gateway 210 can evaluate the frame and compare its contents to the matching criteria associated with each ID. In this case, gateway 210 will determine that the frame has a source MAC address of MAC1 and a destination IP address of IP1. With this information, gateway 210 can search ID table 300 to determine that a match exists and that ID1 is associated with this criteria. As a result, gateway 210 will add ID1 to the frame.

IDs can be added to frames in accordance with various different protocols. For example, the IDs may be in the form of a VLAN tag in accordance with the 802.1Q or 802.1ad protocols, in the form of a label in accordance with the MPLS protocol, or in any other format. Once gateway 210 has added the proper ID, it can forward the modified frame over network 130 via port 212 as represented in step 6.

It is noted that, in some cases, gateway 210 may modify a frame to include a default ID when the frame does not match any criteria in table 300. Therefore, whenever gateway 210 or any other gateway in the network receives a frame that does not match any criteria, the frame may be modified to include the default ID and then forwarded over the network. In short, gateway 210 selectively modifies frames based on the frame's contents matching an entry or not matching any entry in ID table 300.

Figure 3D:
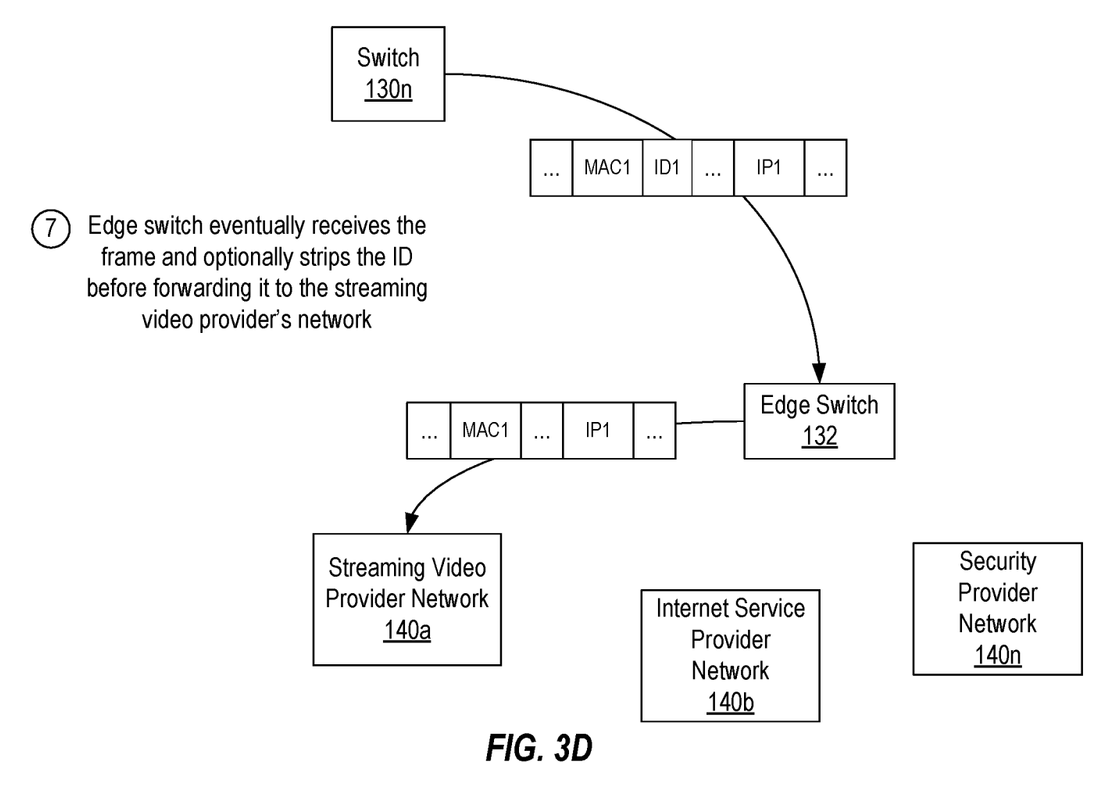

Once gateway 210 forwards the frame with the added ID of ID1 over network 130, the frame will be forwarded towards edge switch 132. In step 7, edge switch 132 will receive the frame and can employ the ID to determine how to forward the frame. In particular, edge switch 132 will maintain a table that associates one or more IDs with each of its inbound ports. In this example, ID1 will be associated with the inbound port by which streaming video provider network 140a is connected to edge switch 132. Edge switch 132 will therefore forward the frame to streaming video provider network 140a.

In some embodiments, edge switch 132 may strip the ID from the frame prior to forwarding it over an inbound port. By removing the ID at edge switch 132, the components of streaming video provider network 140a will not need to be configured to process such IDs. In other words, the use of the IDs is transparent to the components of the provider's network as well as to the user's devices.

Figure 4:
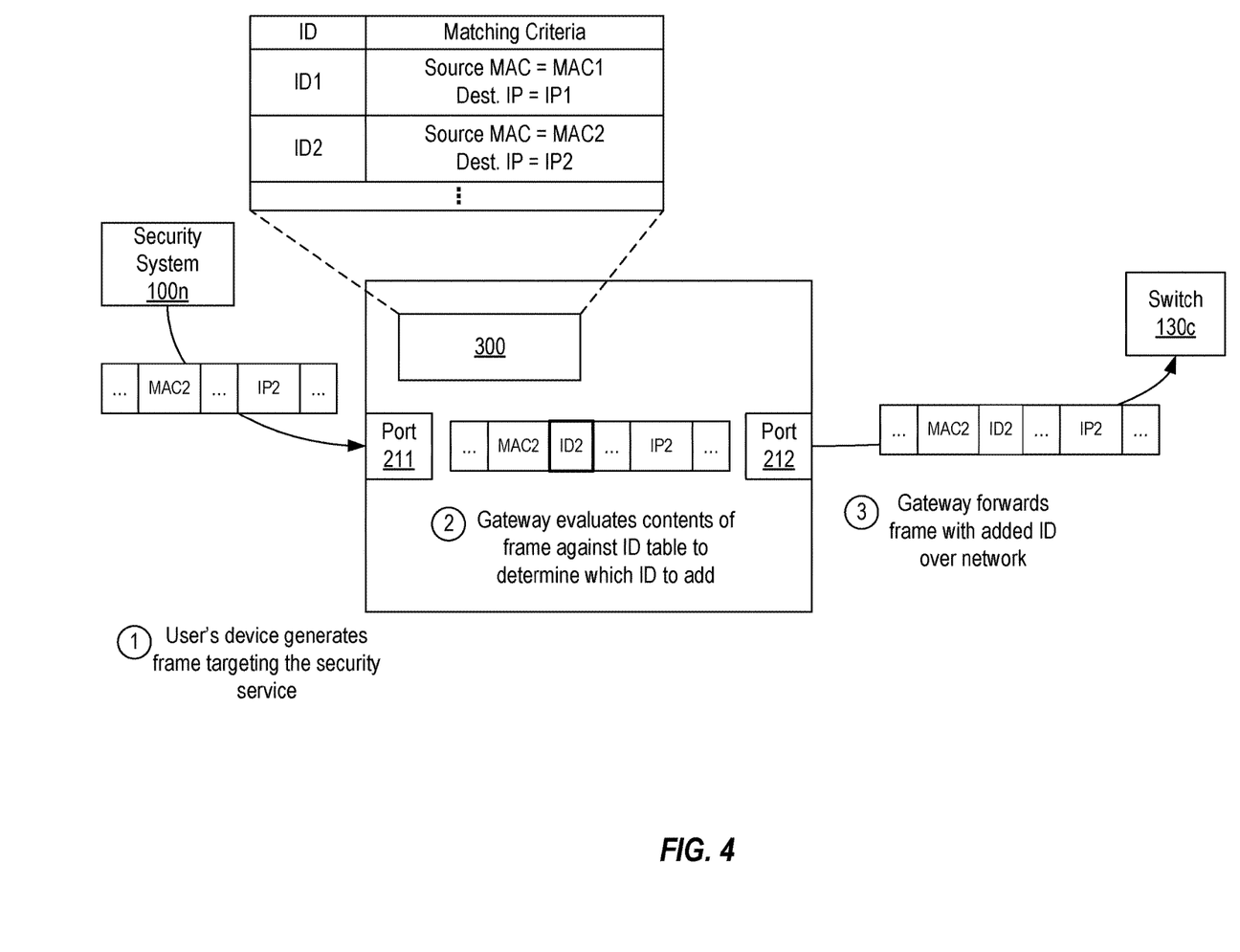
FIG. 4 also illustrates how frames received via a common port can be modified to include a service-specific identifier.

To better illustrate how the present invention isolates services that are provided via the same port, FIG. 4 provides an example where security system 100n sends a frame targeting security provider network 140n. In this example, it is assumed that security system 100n has a MAC address of MAC2 and that the security service provider employs an IP address of IP2 for the security services. Accordingly, in step 1 of FIG. 4, gateway 210 receives a frame from security system 100n via port 211, and this frame includes MAC2 as the source MAC address and IP2 as the destination IP address. In step 2, gateway 210 queries ID table 300 for an entry that matches the contents of this frame. In this case, gateway 210 will determine that ID2 has been associated with the source MAC address of MAC2 and the destination IP address of IP2. In response, gateway 210 will modify the frame to include ID2 and then forward the modified frame out port 212 in step 3. Accordingly, gateway 210 allows the streaming video service and the security service to be provisioned to the user premises via the same port 211 while also ensuring that these services remain isolated.

In summary, gateway 210 can maintain an ID table (or some other data structure) which associates any combination of criteria with a particular ID. The combination of criteria can include layer two information, layer three information, or any other information that can be extracted from a frame that gateway 210 receives from a user's device and that identifies a particular service to which the frame is directed. By evaluating the frames, gateway 210 can add the appropriate ID to each frame to cause the frame to be delivered to the intended service provider when the frame is received at the corresponding edge switch.

Figure 5:
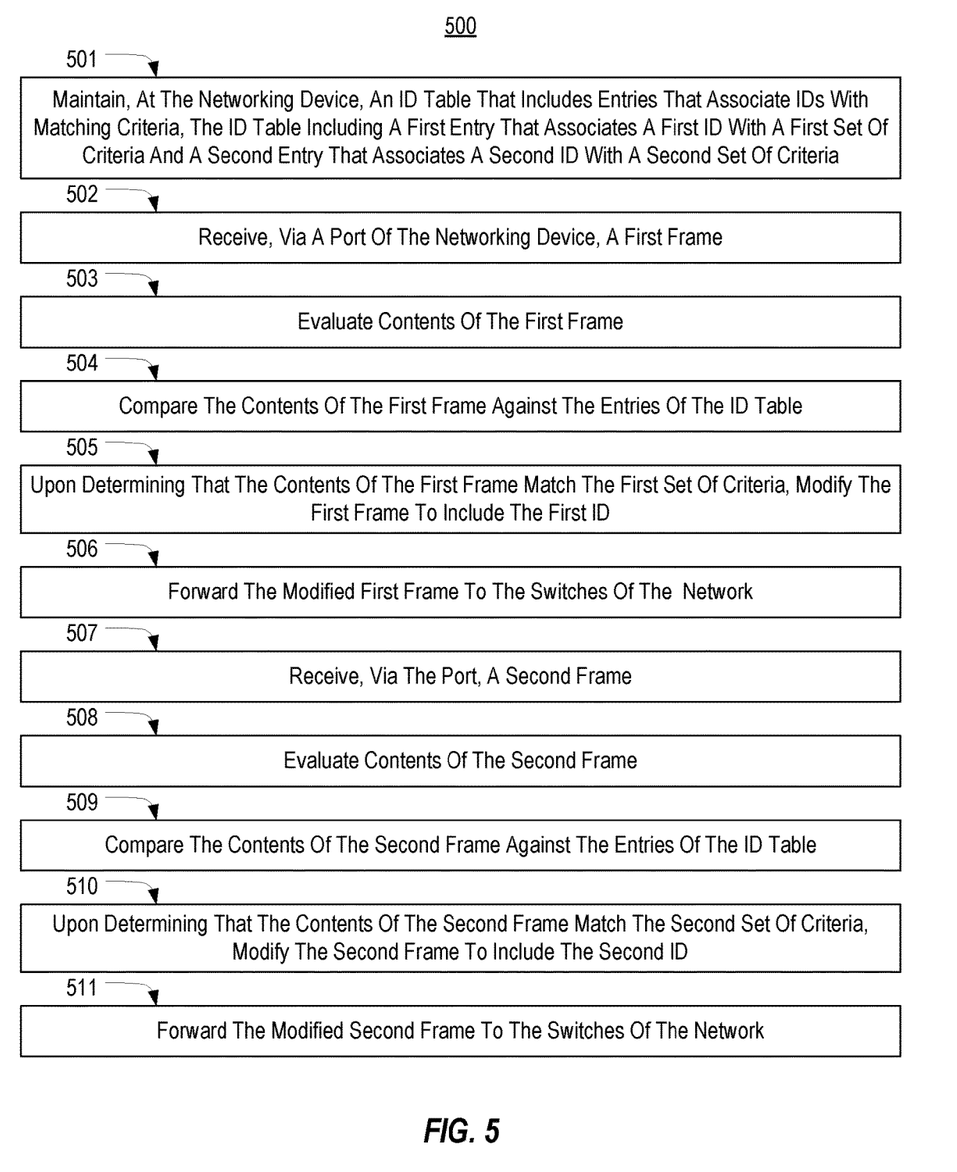
FIG. 5 provides a flowchart of an example method for modifying frames to include a service-specific identifier.

FIG. 5 provides a flowchart of an example method 500 for modifying frames to include a service-specific identifier. Method 500 can be implemented by a gateway at a user's premises (e.g. gateway 210).

Method 500 includes an act 501 of maintaining, at the networking device, an ID table that includes entries that associate IDs with matching criteria, the ID table including a first entry that associates a first ID with a first set of criteria and a second entry that associates a second ID with a second set of criteria. For example, gateway 210 can maintain ID table 300.

Method 500 includes an act 502 of receiving, via a port of the networking device, a first frame. For example, gateway 210 can receive a frame from smart TV 100a that is intended for the streaming video provider.

Method 500 includes an act 503 of evaluating contents of the first frame. For example, gateway 210 can examine a MAC address, IP address, a VLAN tag, a TCP port, etc. of the frame.

Method 500 includes an act 504 of comparing the contents of the first frame against the entries of the ID table. For example, gateway 210 can evaluate the contents of the frame against entries in ID table 300.

Method 500 includes an act 505 of, upon determining that the contents of the first frame match the first set of criteria, modifying the first frame to include the first ID. For example, gateway 210 could add ID1 as a VLAN tag or other type of ID to the frame when it determines that the frame has a source MAC address of MAC1 and a destination IP address of IP1.

Method 500 includes an act 506 of forwarding the modified first frame to the one or more switches of the network. For example, gateway 210 can forward the frame with ID1 over port 212.

Method 500 includes an act 507 of receiving, via the port, a second frame. For example, gateway 210 can receive a frame from security system 100n that is intended for the security service provider.

Method 500 includes an act 508 of evaluating contents of the second frame. For example, gateway 210 can examine a MAC address, IP address, a VLAN tag, a TCP port, etc. of the frame.

Method 500 includes an act 509 of comparing the contents of the second frame against the entries of the ID table. For example, gateway 210 can evaluate the contents of the frame against entries in ID table 300.

Method 500 includes an act 510 of, upon determining that the contents of the second frame match the second set of criteria, modifying the second frame to include the second ID. For example, gateway 210 could add ID2 as a VLAN tag or other type of ID to the frame when it determines that the frame has a source MAC address of MAC2 and a destination IP address of IP2.

Finally, method 500 includes an act 511 of forwarding the modified second frame to the one or more switches of the network. For example, gateway 210 can forward the frame with ID2 over port 212.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a networking device that includes an outbound port by which the networking device is connected to one or more switches of a network and an inbound port to which a plurality of network connectable devices at a user's premises are connected, each of the plurality of network connectable devices providing access to one or more services at the user's premises, the method for modifying frames received at the inbound port to include a service-specific identifier, the method comprising:
   maintaining, at the networking device, an ID table that includes entries that associate IDs with matching criteria, the ID table including a first entry that associates a first ID with a first set of criteria and a second entry that associates a second ID with a second set of criteria;
   receiving, via the inbound port of the networking device, a first frame from a first network connectable device of the plurality of network connectable devices at the user's premises that are connected to the inbound port of the networking device, the first network connectable device providing access to a first service at the user's premises;
   evaluating contents of the first frame;
   comparing the contents of the first frame against the entries of the ID table;
   upon determining that the contents of the first frame match the first set of criteria, modifying the first frame to include the first ID which is specific to the first service;
   forwarding the modified first frame to the one or more switches of the network;
   receiving, via the inbound port of the networking device, a second frame from a second network connectable device of the plurality of network connectable devices at the user's premises that are connected to the inbound port of the networking device, the second network connectable device providing access to a second service at the user's premises;
   evaluating contents of the second frame;
   comparing the contents of the second frame against the entries of the ID table;
   upon determining that the contents of the second frame match the second set of criteria, modifying the second frame to include the second ID which is specific to the second service; and
   forwarding the modified second frame to the one or more switches of the network.

2. The method of claim 1, wherein the matching criteria includes one or more of an identifier of the inbound port of the networking device, a destination IP address, a source IP address, a destination MAC address, or a source MAC address.

3. The method of claim 1, wherein the matching criteria includes two or more of an identifier of the inbound port of the networking device, a destination IP address, a source IP address, a destination MAC address, or a source MAC address.

4. The method of claim 1, wherein the networking device is a gateway and the plurality of network connectable devices connect to the inbound port of the gateway via a hub or router.

5. The method of claim 1, wherein the first and second IDs are associated with different ports of an edge switch to which a first and second service provider are connected respectively, the first service provider providing the first service and the second service provider providing the second service.

6. The method of claim 1, wherein the IDs are VLAN tags.

7. The method of claim 1, wherein the first criteria identify the first network connectable device that sent the first frame and a first service provider to which the first frame is directed, the first service provider providing the first service, and the second criteria identify the second network connectable device that sent the second frame and a second service provider to which the second frame is directed, the second service provider providing the second service.

8. The method of claim 7, wherein the first criteria identify the first network connectable device using the first network connectable device's MAC address and the second criteria identify the second network connectable device using the second network connectable device's MAC address.

9. The method of claim 8, wherein the first criteria identify the first service provider using the first service provider's IP address and the second criteria identify the second service provider using the second service provider's IP address.

10. The method of claim 1, wherein the matching criteria includes a layer three port.

11. One or more computer storage media storing computer executable instructions which, when executed by a gateway that includes an outbound port by which the gateway is connected to one or more switches of a network and an inbound port to which a plurality of network connectable devices at a user's premises are connected, each of the plurality of network connectable devices providing access to one or more services at the user's premises, implement a method for modifying frames received at the inbound port of the gateway to include a service-specific identifier, the method comprising:
   maintaining, at the gateway, an ID table that includes entries that associate IDs with matching criteria, the ID table including a first entry that associates a first ID with a first set of criteria and a second entry that associates a second ID with a second set of criteria;
   receiving, via the inbound port of the gateway, a first frame from a first network connectable device of the plurality of network connectable devices at the user's premises that are connected to the inbound port of the gateway, the first network connectable device providing access to a first service at the user's premises;
   evaluating contents of the first frame;
   comparing the contents of the first frame against the entries of the ID table;
   upon determining that the contents of the first frame match the first set of criteria, modifying the first frame to include the first ID which is specific to the first service;
   forwarding the modified first frame to the one or more switches of the network;
   receiving, via the inbound port of the gateway, a second frame from a second network connectable device of the plurality of network connectable devices at the user's premises that are connected to the inbound port of the gateway, the second network connectable device providing access to a second service at the user's premises;
evaluating contents of the second frame;
comparing the contents of the second frame against the entries of the ID table;
upon determining that the contents of the second frame match the second set of criteria, modifying the second frame to include the second ID which is specific to the second service; and
forwarding the modified second frame to the one or more switches of the network.

12. The computer storage media of claim 11, wherein the matching criteria includes one or more of an identifier of the inbound port of the gateway, a destination IP address, a source IP address, a destination MAC address, or a source MAC address.

13. The computer storage media of claim 11, wherein the first and second IDs are associated with different ports of an edge switch to which a first and second service provider are connected respectively, the first service provider providing the first service and the second service provider providing the second service.

14. The computer storage media of claim 11, wherein the first criteria identify the first network connectable device that sent the first frame and a first service provider to which the first frame is directed, the first service provider providing the first service, and the second criteria identify the second network connectable device that sent the second frame and a second service provider to which the second frame is directed, the second service provider providing the second service.

15. The computer storage media of claim 14, wherein the first criteria identify the first network connectable device using the first network connectable device's MAC address and the second criteria identify the second network connectable device using the second network connectable device's MAC address; and
wherein the first criteria identify the first service provider using the first service provider's IP address and the second criteria identify the second service provider using the second service provider's IP address.

16. The computer storage media of claim 11, wherein the method further comprises:
adding an entry to the ID table in response to the user subscribing to another service provided over the network, the added entry defining a unique ID and associated criteria.

17. The computer storage media of claim 11, wherein the method further comprises:
receiving frames from the network, and
removing an ID from each of the received frames prior to forwarding the frames over the inbound port of the gateway.

18. A software-defined network architecture comprising:
a gateway that includes an outbound port by which the gateway is connected to one or more switches of a network and an inbound port to which a plurality of network connectable devices at a user's premises are connected, each of the plurality of network connectable devices providing access to one or more services at the user's premises; and
an edge switch that includes a first port and a second port, the first port connecting a first service provider network to the one or more switches of the network, the second port connecting a second service provider network to the one or more switches of the network;
wherein the gateway is configured to perform the following method for modifying frames received at the inbound port to include a service-specific identifier:
maintaining an ID table that includes entries that associate IDs with matching criteria, the ID table including a first entry that associates a first ID with a first set of criteria and a second entry that associates a second ID with a second set of criteria;
receiving, via the inbound port of the gateway, a first frame from a first network connectable device of the plurality of network connectable devices at the user's premises that are connected to the inbound port of the networking device, the first network connectable device providing access to a first service at the user's premises;
evaluating contents of the first frame;
comparing the contents of the first frame against the entries of the ID table;
upon determining that the contents of the first frame match the first set of criteria, modifying the first frame to include the first ID, the first ID being associated with the first port of the edge switch;
forwarding the modified first frame to the one or more switches of the network;
receiving via the inbound port of the networking device, a second frame from a second network connectable device of the plurality of network connectable devices at the user's premises that are connected to the inbound port of the networking device, the second network connectable device providing access to a second service at the user's premises;
evaluating contents of the second frame;
comparing the contents of the second frame against the entries of the ID table;
upon determining that the contents of the second frame match the second set of criteria, modifying the second frame to include the second ID, the second ID being associated with the second port of the edge switch; and
forwarding the modified second frame to the one or more switches of the network.

19. The software-defined network architecture of claim 18, wherein the edge switch is configured to forward frames that are received from the one or more switches of the network over the first port of the edge switch when the frames have the first ID and to forward frames that are received from the one or more switches of the network over the second port of the edge switch when the frames have the second ID.

20. The software-defined network architecture of claim 18, wherein the matching criteria for at least one of the entries includes layer two and layer three information.

* * * * *